Patented Sept. 9, 1947

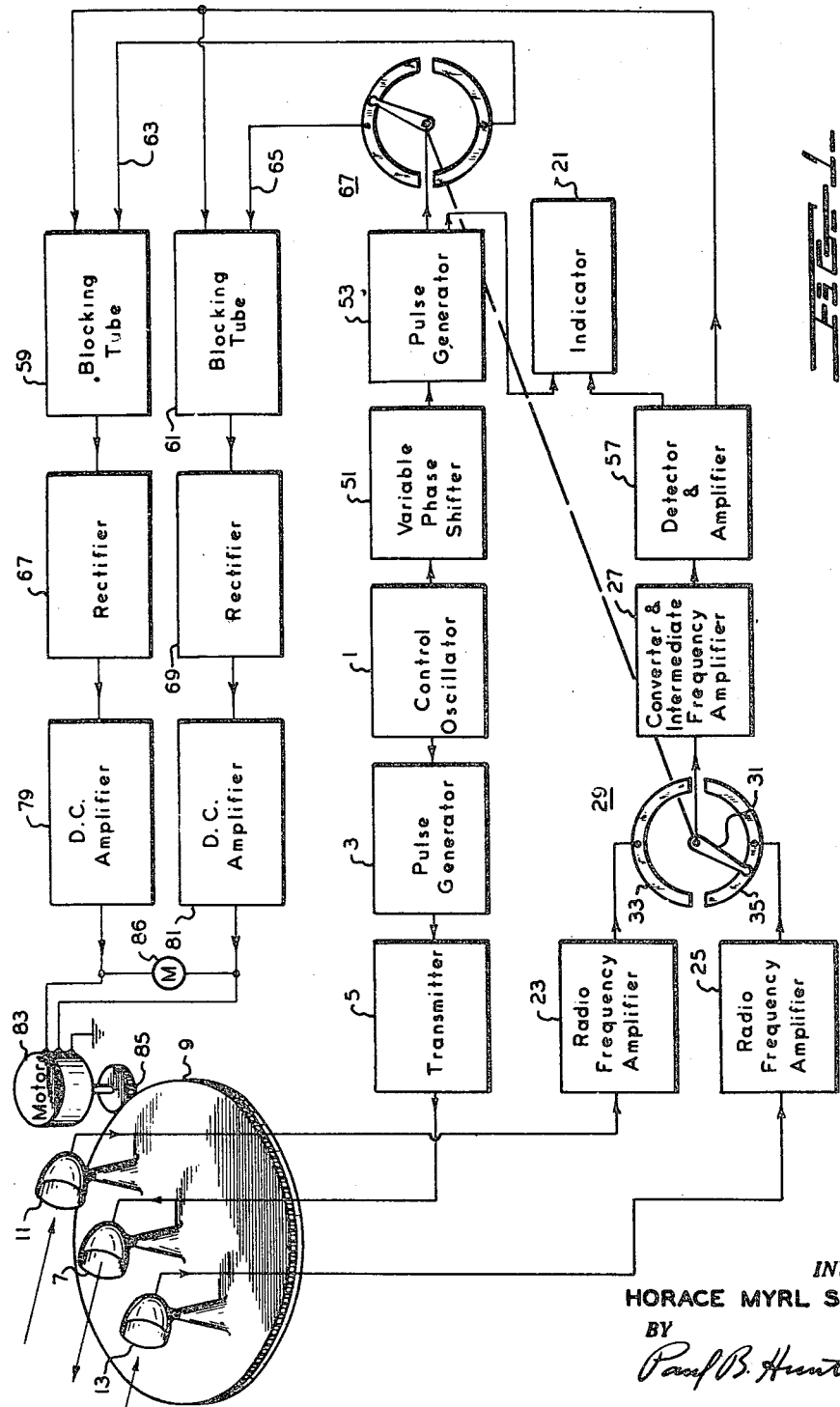

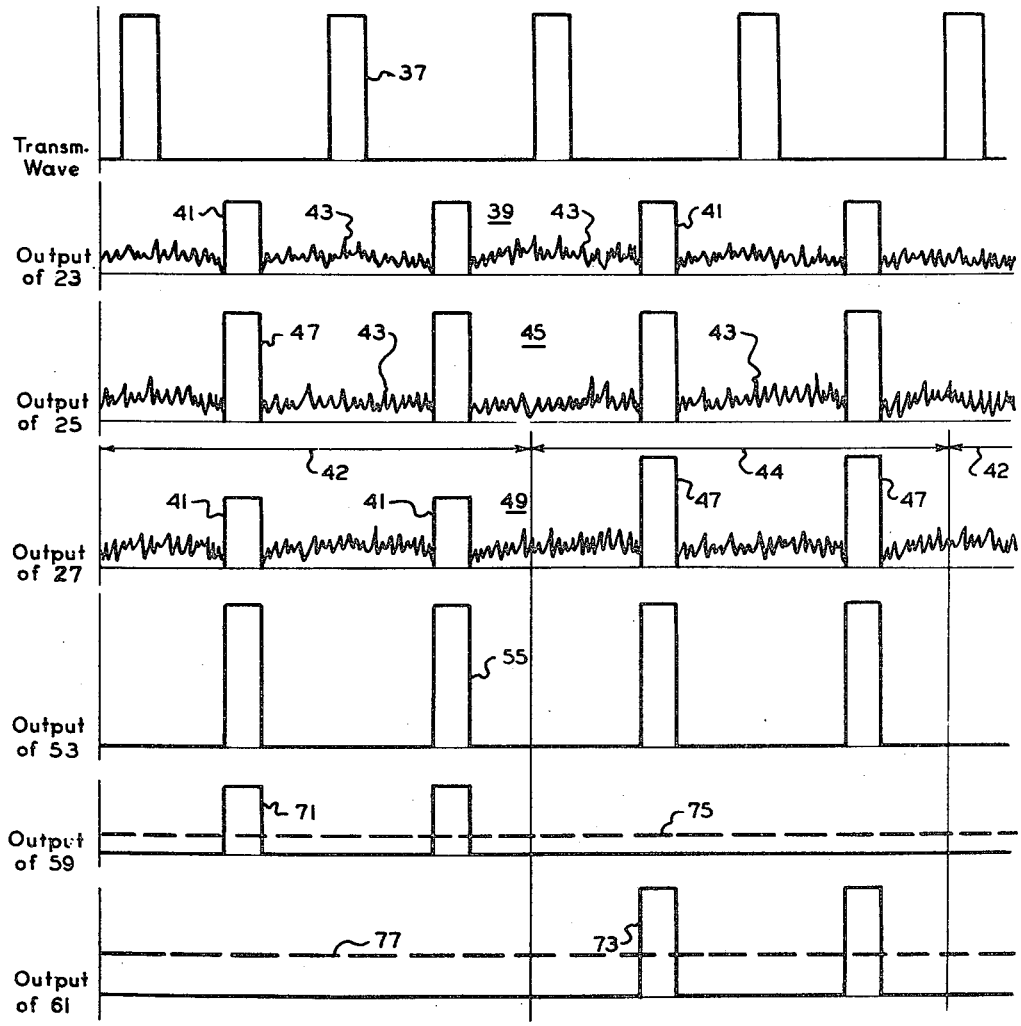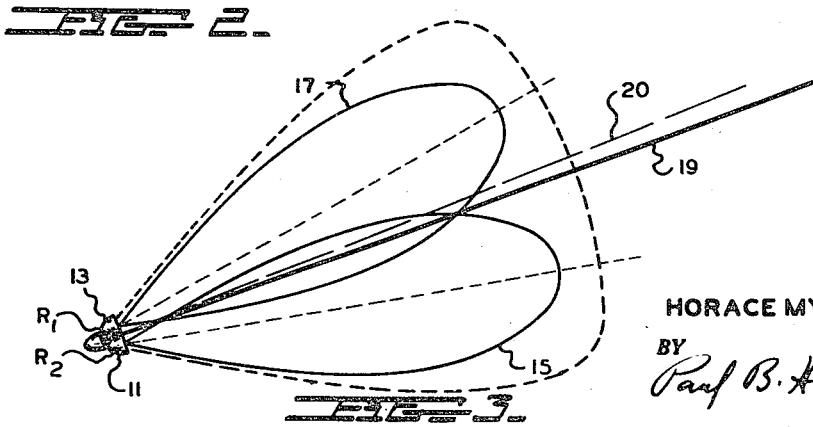

2,427,029

UNITED STATES PATENT OFFICE 2,427,029

AUTOMATIC TRACKING SYSTEM

Horace Myrl Stearns, Merrick, N. Y., assignor to Sperry Gyroscope Company, Inc., Brooklyn, N. Y., a corporation of New York Application April 10, 1942, Serial No. 438,392

16 Claims. (Cl. 250—1.54)

1

The present invention relates to object detecting and distance and orientation indicating radio systems.

In many of the above types of system it is well known to transmit periodic pulses of radiant energy and to measure the time interval between the transmission of the pulse and the reception of corresponding pulses reflected from a distant object to determine the distance to the distant reflecting object. It is also known to use such reflected pulses to determine the orientation of the distant object.

It is desirable in such systems to use highly directive radiating systems in order to concentrate sufficient amounts of radiant energy in the direction of the target or distant object, so as to provide suitable reflections from the distant object. However, difficulty is encountered in using such highly directive systems since it is not easy to maintain the radiation in the direction of the target, especially if the target is swiftly moving.

By the present invention a system is provided wherein the radiating system is automatically maintained oriented towards the target, thereby insuring efficient transmission of energy and efficient indication of the distance and/or direction of the target.

Accordingly, it is an object of the present invention to provide improved devices for automatically maintaining a predetermined axis oriented toward a distant body.

It is a further object of the present invention to provide an automatically oriented directive radiant energy system which maintains its orientation toward a distant object.

It is another object of the present invention to provide an improved system for automatically orienting a radiant energy transmitter toward a distant object by the use of two overlapping and alternately effective directional receiving systems.

It is still another object of the present invention to provide improved devices for substantially eliminating the effect of noise and stray pulses upon a radio direction and distance indicating system.

It is still a further object of the present invention to provide improved devices for substantially eliminating the effect of noise and stray pulses upon a radio direction and distance indicating system including two overlapping and alternately effective directional receiving systems.

Other objects and advantages will become apparent from the specification, taken in connection with the accompanying drawings wherein the invention is embodied in concrete form.

In the drawings,

Fig. 1 shows a schematic block diagram of a preferred embodiment of the system of the invention.

Fig. 2 shows representative voltage time curves of various portions of the circuit of Fig. 1.

Fig. 3 shows a cross-sectional view of the radiation patterns of the directive antennae of the system of Fig. 1.

Referring to Fig. 1, a control oscillator 1, of any suitable type, generates a control voltage of predetermined frequency, such as of the order of 4,000 cycles per second. This control voltage is fed to a pulse generator 3, of any well known type, adapted to produce in its output a recurring sequence of pulses of predetermined and preferably short duration, having a repetition frequency corresponding to the frequency of control oscillator 1. The pulses derived in generator 3 are used to suitably control a conventional transmitter and modulator unit 5 to produce in its output a recurring sequence of periodic short pulses of high frequency energy. This energy is fed to a suitable directive radiating system, indicated schematically as being a parabolic reflector 7 containing a suitable radiating antenna.

Transmitter arrangement 7 is mounted on a suitable rotatable platform 9 which also carries a pair of receiving antenna arrangements 11 and 13. Antenna arrangements 11 and 13 are arranged to have overlapping radiation patterns, such as 15 and 17 shown in Fig. 3, herein disclosed as reception patterns, although under the well-known Rayleigh-Carson reciprocity theorem, the foregoing antennae may be interchanged.

It will be clear that if a reflecting object is located along the equi-signal axis 19 of these receptivity patterns 15 and 17, then pulses transmitted from radiator 7 and reflected from the distant object will be received with equal intensity in receiving antennae 11 and 13, because of their symmetrical relation to the wave front of radiant energy waves. Should the reflecting object be located at any other point, it will be clear that unequal intensities of reflected pulse will be obtained.

In the present system these reflected pulses are used to control platform 9 to maintain the distant reflecting object along the axis 19 of equal signal receptivity. That is, the axis 19 is caused to track with the distant object. Thus, the respective receiving antennae 11 and 13 are connected to radio frequency amplifiers 23 and 25 of any conventional type, whose outputs are alternately conducted to a single frequency converter and intermediate frequency amplifier 27 as by way of a suitable commutator 29. Commutator 29 is shown here as being simply a mechanically actuated arm 31 cooperating with respective commutator segments 33 and 35, to render said respective directive antennae alternately inoperable but it is to be understood that any suitable type of commutator, including suitable electronic devices, may be used here.

Commutator 29 is actuated at a suitable rate usually less than the frequency of control oscillator 1. In the illustration to be used in the present case, the frequency of commutation will be assumed to be approximately one-quarter that of the control oscillator 1, although it is to be understood that this is illustrative only and, as a matter of fact, any suitable control and commutating frequencies may be used. Furthermore, as will be seen, it is unnecessary for these frequencies to bear any particular relationship, such as a harmonic relationship, to one another.

If desired, the outputs of receiving arrangements 11 and 13 may be separately frequency converted to the same intermediate frequency, as by using a common local oscillator, before commutation by commutator 29, in which case rectangles 23 and 25 would include frequency converters, and rectangle 27 would include only the intermediate frequency stages.

The transmitted wave envelope is as shown at 37 in Fig. 2. Assuming that the reflecting object is not exactly along axis 19, but along some other orientation such as 20, then the output of one of the amplifiers, such as 23 may be as shown at 39, including reflected pulses 41 and various noise and stray pulses such as 43. The output wave of the other amplifier 25 may be as shown at 45 of Fig. 2, including reflected pulses 47 and noise 43. It will be noted that the reflected pulses 41 and 47 of these two received waves are received substantially at the same instant but have differing amplitudes due to the difference in the receptivity of the two receivers 11 and 13 for the particular illustrative orientation 20 of the reflecting object.

The commutator 29 acts to alternately transmit a portion of the wave 39 and a portion of the wave 45 to the intermediate frequency amplifier 27. Thus, the wave transmitted to amplifier 27 may be as shown at 49 in Fig. 2, containing a succession of received pulses 41 during intervals 42 followed by a succession of received pulses 47 during alternate interval 44.

In order to obtain control voltages for positioning the platform 9, it will be seen that the relative magnitudes of pulses 41 and 47 may be used. Thus, a control circuit may be provided differentially responsive to the amplitude of pulses 41 and pulses 47. It is impossible, however, to simply rectify the output of amplifier 23 and obtain thereby a voltage corresponding to the instantaneous or average amplitude of the pulses 41, for example, because of the erratic noise wave 43 which necessarily accompanies the received pulses 41. The same is true of amplifier 25.

In order to overcome this defect, a pulse gate is provided which is arranged to pass only the pulses 41 or 47 and to substantially block out the noise 43. Thus, control oscillator 1 also energizes a suitable adjustable phase shifter 51 of any conventional type, whose output controls a pulse generator 53, which may be similar to pulse generator 3, and is adapted to produce pulses of predetermined amplitude having a repetition frequency corresponding to the frequency of control oscillator 1. These pulses preferably have a duration of the order of received pulses 41 or 47. The output wave from pulse generator 53 may be as shown at 55 in Fig. 2. It will be clear that by suitably adjusting the amount of shift produced by phase shifter 51, the phase position of these pulses 55 may be adjusted with respect to the transmitted pulses 37 or the received pulses 41 or 47.

The output of intermediate frequency amplifier 27 is passed through a suitable detector or demodulator 57 to obtain therefrom currents corresponding to the wave envelope of the wave shown at 49 in Fig. 2. These currents are passed through a pair of blocking amplifier tubes 59 and 61, which are normally maintained non-conductive, and are rendered periodically conductive by means of the voltages applied to their inputs 63 and 65. These inputs are derived from pulse generator 53 through a suitable commutator arrangement 67, which may be similar to commutator 29, and is synchronized therewith. In this way, the output of pulse generator 53 is alternately fed to blocking tubes 59 and 61 in synchronism with the switching operation performed by commutator 29.

Since tube 59, for example, is conductive only during the periods when pulses 55 are fed to it from commutator 67, it will be clear that if these pulses 55 are made cophasal or coincident in time with the pulses 41 of wave 49, that the output of tube 59 will pass only desired pulses 41, eliminating the noise pulses 43, as shown at 71. Similarly, tube 61 may be made to pass only the pulses 47 of wave 49, as shown at 73. Since the pulses 55 render the tubes 59 and 61 conductive only during the periods that the reflection signals appear, and permit these tubes to reject intervening noise and other extraneous received signals, the pulses 55 may be referred to as "gating pulses" and the operation itself as "gating."

To assure such phase coincidence, indicator 21 is used, which is energized by the pulse wave 55 derived from pulse generator 53, and the pulse wave 49 derived from detector 57. Indicator 21 may be of any type suitable for indicating phase coincidence between its two input waves, such as the type shown in copending application Serial No. 375,373 for Phase angle indicator, filed January 22, 1941, in the name of James E. Shepherd, or application Serial No. 430,764, for Phase angle indicator, filed February 13, 1942, in the name of Edward L. Ginzton, both assigned to the same assignee as the present application. Indicator 21 may also include devices for indicating the relative intensity of pulses 41 and 47, as by suitable cathode ray tube indicators which form no part of the present invention, whereby the relation between the actual orientation 20 and desired orientation 19 of the distant reflecting object may be indicated.

In operation, therefore, the operator will suitably actuate phase shifter 51 to maintain pulses 55 in synchronism with pulses 41 and 47, as indicated by indicator 21.

If desired, automatic circuits may be used to maintain this phase synchronism. Such circuits are adapted to maintain a locally generated pulse in synchronism with a variable phase pulse by adjustment of a phase shifter. Such a circuit adapted to control a mechanically adjustable phase shifter is shown in copending Silhavy application Serial No. 432,290 for Pulse systems, filed February 25, 1942. A similar circuit adapted to control an electronically adjustable phase shifter is shown in applicant's copending application Serial No. 434,403 for Pulse receiving systems, filed March 12, 1942.

It will be clear that the amount of phase shift produced in phase shifter 51 to effect phase coincidence between pulses 55 and 49 may be used as an indication of the range or distance of the reflecting object.

The outputs of blocking tubes 59 and 61, which may thus have the wave shape shown at 71 and 73, respectively, of Fig. 2, are fed to respective rectifiers 67 and 69 of any conventional type whose filtered outputs will then represent the average values such as 75 and 77 of the reflected pulses received by the receiving arrangements 11 and 13.

The outputs of rectifiers 67 and 69 may be amplified in any suitable direct current amplifiers 79, 81, whose outputs are then differentially combined to actuate a suitable motor 83 adapted to rotate platform 9 as by means of gearing 85. Motor 83 is preferably of the reversible type and is adjusted to rotate platform 9 in a direction to orient directivity axis 19 toward the distant reflecting object. If desired, any other type of motor 83 and its control circuit may be used. In this manner, the radiating system 7, 11, 13 is continuously oriented toward the distant object at least along one coordinate.

A meter 86 may be used to indicate the voltage input to motor 83, and thereby also indicate the relative displacement between the actual orientation 20 and the desired orientation 19 of the distant object.

If it is desired to obtain the orientation of the distant reflecting object along two independent coordinates, such as in azimuth and in elevation, the device shown in Fig. 1 may be duplicated, the second system being adapted for rotation about an axis perpendicular to that of the system shown in Fig. 1. A common transmitter 5, 7 may be used for both systems.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An automatic tracking device comprising antenna means for radiating periodic pulses of radiant energy, means for receiving reflections of said radiant energy from a distant body, including a pair of directional radiant energy receiving antennae having overlapping receptivity patterns defining a line of equi-intensity reception, means for orienting said receiving antennae, means for deriving respective periodic signal pulse waves from said receiving antennae corresponding to said reflections, a common transmission channel for said signal waves, means for alternately transmitting said signal waves through said channel, a pair of normally blocked amplifiers each connected to the output of said channel, means for locally generating a periodic pulse wave of the same periodicity as said received signals, means for adjusting the phase of said local wave to phase coincidence with said signal waves, means for alternately unblocking said amplifiers under the control of said local wave in synchronism with said alternate transmission, whereby each of said amplifiers passes a respective periodic signal pulse wave substantially stripped of noise and stray pulses, and means responsive to said stripped waves for controlling said orienting means so as to maintain said equi-intensity line in a position whereby said stripped waves have equal magnitude, whereby said line is automatically oriented toward said object.

2. An automatic tracking device comprising antenna means for radiating periodic pulses of radiant energy, means for receiving reflections of said radiant energy from a distant body including a pair of directional radiant energy receiving antennae having overlapping receptivity patterns defining a line of equi-intensity reception means for orienting said receiving antennae, means for deriving respective periodic signal pulse waves from said receiving antennae, means for locally generating a periodic pulse wave of the same periodicity as said received signal waves, means for adjusting the phase of said local wave to be coincident with that of said signal waves, a pair of normally blocked amplifiers, means for alternately supplying both said signal waves to each of said amplifiers, means for alternately unblocking said amplifiers under the control of said local pulse wave in synchronism with said alternate supplying, whereby each of said amplifiers passes only a respective signal pulse wave substantially stripped of noise and stray pulses, and means responsive to the average value of said stripped waves for controlling said orienting means so as to maintain said equi-intensity lines in a position whereby said stripped waves have equal magnitude, whereby said line is automatically oriented toward said body.

3. An automatic tracking device comprising means for radiating periodic pulses of radiant energy, means for receiving reflections of said radiant energy from a distant body including a pair of directional radiant energy receiving antennae having overlapping receptivity patterns defining a line of equi-intensity reception, means for orienting said receiving antennae, means for deriving respective periodic pulse signal waves from said receiving antennae, means for locally generating a periodic pulse wave of the same periodicity as said signal waves, means for adjusting the phase of said local wave to be coincident with that of said signal waves, a pair of channels, means for transmitting said signal pulse waves to respective channels only during said local pulses whereby said signal waves are substantially stripped of noise and stray pulses, and means responsive to the average value of said stripped waves for controlling said orienting means so as to maintain said equi-intensity line in a position wherein said stripped waves have equal amplitude, whereby said line is automatically oriented toward said body.

4. An automatic tracking device comprising means for radiating periodic pulses of radiant energy, means for receiving reflections of said radiant energy from a distant body including a pair of directional radiant energy receiving antennae having overlapping receptivity patterns defining a line of equi-intensity reception, means for orienting said receiving antennae, means for deriving periodic pulse signal waves from said respective receiving antennae, means for locally generating a periodic pulse wave of the same periodicity as said signal waves, means for adjusting the phase of said local wave to be coincident with that of said signal waves, means for stripping said signal waves of noise and stray pulses, and means responsive to said stripped waves for controlling said orienting means so as to maintain said equi-intensity line in a position wherein said stripped waves have equal magnitude, whereby said line is automatically oriented toward said body.

5. An automatic tracking device comprising antenna means for radiating periodic pulses of radiant energy and for receiving reflections of said radiant energy from a distant body, said antenna means including a pair of directional radiant energy antennae having overlapping radiation patterns defining a line of equi-intensity signals, antenna orienting means, means for deriving periodic signal waves alternately from said respective directional antennae, means for stripping said signal waves of noise and stray pulses, and means responsive to the amplitude of said waves for controlling said orienting means so as to maintain said equi-intensity line toward said body.

6. An automatic tracking device comprising means for radiating periodic pulses of radiant energy, means for receiving reflections of said radiant energy from a distant body, including a pair of directional radiant energy receiving antennae having overlapping receptivity patterns defining a line of equi-intensity reception, antennae orienting means, means for deriving signal pulse waves from said respective receiving antennae during equal intermittent periods, and means responsive to said waves for controlling said antennae orienting means for maintaining said line toward said body.

7. A method of maintaining a pair of directive receiving antennae in fixed relation to a radiant energy wave front, comprising commutating received radiant energy waves from said respective antennae to provide energy responses during equal intervals from each of said antennae, moving said antennae continuously toward a position of equi-intensity reception, and controlling the direction and extent of the movement as a function of a differential between the responses from said respective antennae.

8. A method of maintaining a pair of directive receiving antennae with their receptivity patterns in fixed relation to a wave front of radiant energy pulses, comprising deriving signals from each of said antennae during equal intermittent periods including the step of separating the received pulses from extraneous noise energy, and orienting said patterns as a function of a differential between the signals from said respective antennae.

9. A method as claimed in claim 8, wherein said periods extend over a plurality of pulses, and wherein said signals are averaged to produce an integrated signal of substantially constant amplitude.

10. A method of orienting a pair of directive radio antennae so that a line of equi-intensity radiation is maintained in fixed relation to a source of radiant energy pulses, said method comprising stripping the received energy of noise and extraneous radiant energy, deriving pulsing signals from said stripped received energy, and controlling the movement of said line of equi-intensity radiation relative to said source in response to said pulsing signals.

11. A method as claimed in claim 10, including the step of deriving said signals from said respective antennae alternately during periods of short equal duration.

12. In an automatic tracking device having means responsive to signals derived from a plurality of directive receiving antennae for orienting a line of equi-intensity reception in fixed relation to a wave front of radiant energy waves, the provision of commutator means adapted to interrupt the signals from the respective antennae alternately during short equal intervals.

13. An automatic tracking device adapted to maintain a pair of directional antennae with a line of equi-intensity radiation in predetermined relation to a reflector of radiant energy pulses, said device comprising means for deriving reflected pulse signal waves alternately from said respective antennae, means for locally generating a periodic pulse wave of the same periodicity as said signal waves, means for adjusting the phase of said pulse wave to be coincident with that of said signal waves, means for orienting said antennae, and control means responsive to said coincident pulse and signal waves and operative on said orienting means to maintain said equi-intensity line at a position in which the signal waves derived from each antenna are of equal magnitude.

14. A tracking device as claimed in claim 13, including indicator means for denoting the phase displacement between said signal waves and said pulse waves.

15. An automatic tracking device, comprising radiating and receiving antenna means including a pair of directive antennas having overlapping directivity patterns defining an equi-signal line, and means for orienting said line toward a reflecting object, comprising means for stripping the energy received from such object of noise and other extraneous pulses, means for determining the ratio of the intensities of the energy derived from said respective patterns, and power means operative to shift said line in accordance with said ratio.

16. An automatic tracking device, comprising radiating and receiving antenna means including a pair of directive antennas having overlapping directivity patterns defining an equi-signal line, and means for orienting said line toward a reflecting object, comprising a pulse transmitter for intermittently energizing said radiating antenna means, means for receiving reflected energy pulses derived alternately from said respective patterns, means for stripping from said received energy noise and other extraneous pulses occurring in the intervals between said received reflected energy pulses, means for deriving from said received energy signal pulses indicative of the intensity of the energy derived from said respective patterns, and power means responsive to said signal pulses for shifting said line toward such object.

HORACE MYRL STEARNS.

REFERENCES CITED

The following references are of record in the file of this patent:

UNITED STATES PATENTS

| Number | Name | Date |
| --- | --- | --- |
| 2,063,534 | Wallace | Dec. 8, 1936 |
| 2,109,475 | Fanning | Mar. 1, 1938 |
| 2,176,469 | Moueix | Oct. 17, 1939 |
| 2,116,717 | Scharlau | May 10, 1938 |

FOREIGN PATENTS

| Number | Country | Date |
| --- | --- | --- |
| 199,434 | Great Britain | June 13, 1923 |